Nov. 17, 1931.  G. R. McDERMOTT  1,832,133
COMBUSTION APPARATUS
Filed Oct. 5, 1928
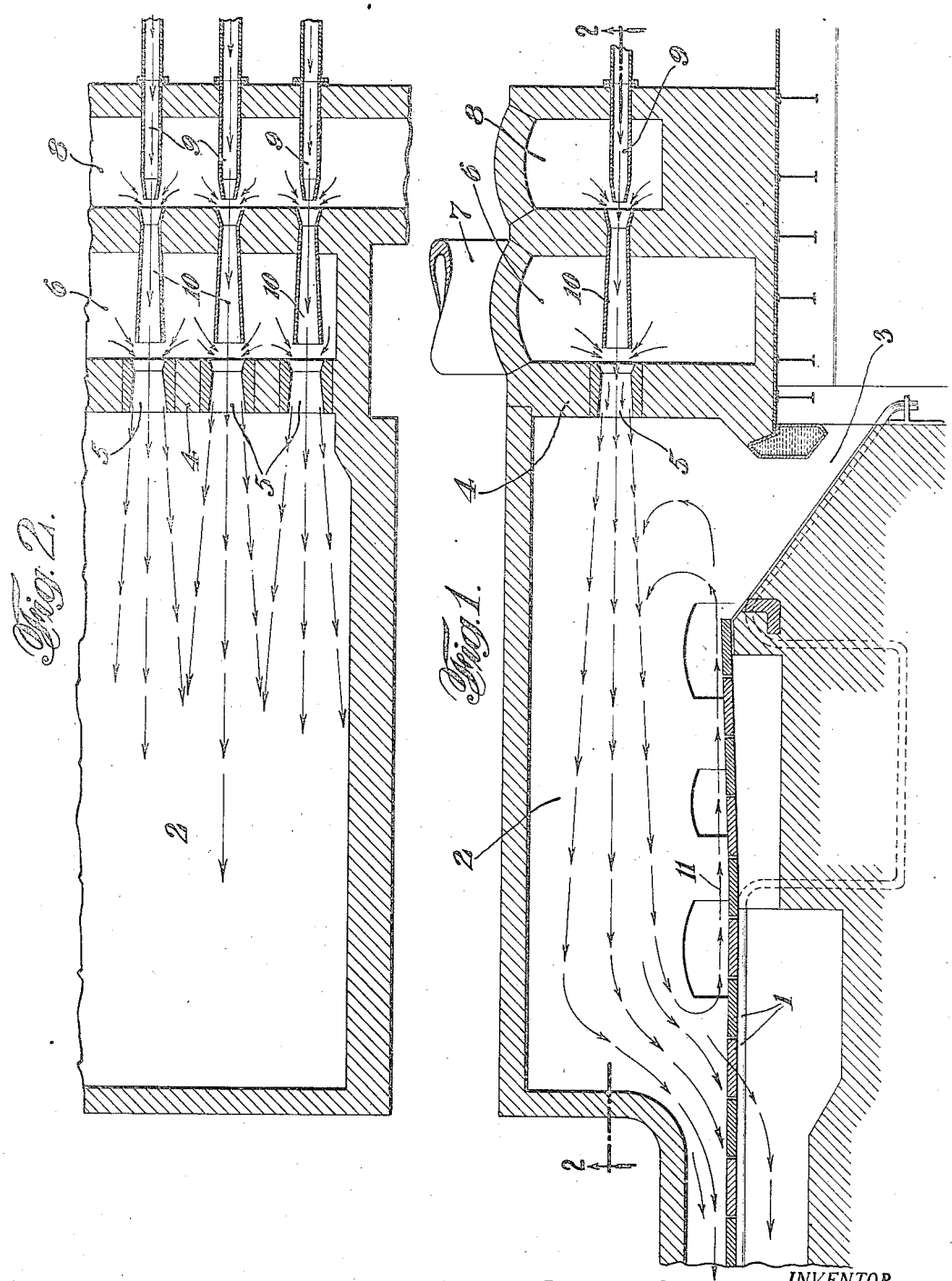

Patented Nov. 17, 1931

1,832,133

UNITED STATES PATENT OFFICE

GEORGE R. McDERMOTT, OF MOUNT VERNON, OHIO, ASSIGNOR TO THE CHAPMAN-STEIN COMPANY, OF MOUNT VERNON, OHIO, A CORPORATION OF OHIO

COMBUSTION APPARATUS

Application filed October 5, 1928. Serial No. 310,464.

The invention relates more particularly to industrial furnaces using preheated air for combustion, such as metallurgical and ceramic furnaces, wherein gaseous fuels are employed, and aims generally to improve the efficiency of such furnaces and enable the heat of the flame to be better distributed and directed in the furnace.

Another object of the invention is to provide a burner construction for furnaces of the above nature in which raw producer gas, with its usual tarry content may be efficiently employed. It should be understood that other combustible gases, such as coke oven gas and blast furnace gas, may be employed as a fuel.

Further objects and advantages of the invention will be in part obvious, and in part specifically referred to in the description hereinafter contained, which taken in conjunction with the accompanying drawings, discloses a preferred embodiment of the invention; such embodiment, however, is to be considered as merely illustrative of its principles. In the drawings, Fig. 1 is a longitudinal vertical section through a furnace of the continuous push type, which is constructed to operate in accordance with the invention.

Fig. 2 is a partial horizontal section taken on line 2—2 of Fig. 1 and looking in the direction of the arrows.

The use of preheated air and raw, hot producer gas in industrial furnaces has heretofore entailed certain difficulties; for one thing, best efficiency of combustion requires that both the gas and the air mixed with it for combustion should be hot, but it is not usually feasible to supply hot gas and preheated air at any pressures sufficient to obtain enough velocity in the flames issuing from the burner, to enable the heat to be properly directed and distributed in the heating chamber.

In accordance with the present invention, the desired efficiency and flame velocity are obtained by employing a burner construction in which the gaseous fuel (preferably hot) is mixed with the preheated air required for combustion, by the aid of a two-stage burner, in which a minor proportion of relatively cool air is supplied in the form of a jet at relatively high pressure and velocity, which jet serves to draw the hot gas and preheated air along with it and project the same into the combustion or heating chamber at relatively high velocity and without undue cooling.

In the drawings the invention is illustrated as applied to a continuous push furnace wherein the billets to be heated travel along on suitable water cooled skids 1, through a combustion or heating chamber 2, to the discharge end 3 of the furnace, it being desired that the billets shall attain the proper heat shortly after they enter chamber 2, and that this heat shall be evenly maintained while they are passing through such chamber.

The side wall 4 of the combustion chamber is provided with a series of admission ports 5 disposed horizontally across the chamber and forming passage ways which afford communication between the latter and a hot producer gas chamber 6, which runs along the exterior of side wall 4 and may be understood as connected to a gas producer by a flue 7 (Fig. 1).

A preheated air chamber 8 runs along the furnace beside gas chamber 6, which chamber 8 may be understood as receiving preheated air from a recuperator (not illustrated) receiving its heat from the spent furnace gases.

The gas in chamber 6 will usually be supplied at a temperature around 1,000 degrees F. and at a pressure of about ¼ inch to ½ inch of water, while the temperature of the preheated air in chamber 8 may run up to as high as 1,800 degrees F., and the pressure from about .01 inch to .1 inch.

Jets or streams of relatively cool air are supplied at relatively high pressure, for example, from 6 inches up, through a series of nozzles 9 directed into chamber 8 and alined with the admission ports 5 and these jets pass through tubes or passage ways 10 in such manner as to aspirate or draw preheated air from chamber 8 into the tubes 10 in the first stage of the burner construction, and draw hot producer gas from chamber 6 into the admission ports 5 in the second stage, from which latter the mixture of air and gas is projected into a combustion chamber 2.

In the above manner the velocity of the entering flames is stepped up sufficiently to carry them in relatively confined streams extending clear across the combustion chamber 2, thus concentrating the heat at the desired point where the billets to be heated enter the chamber, and as illustrated in Fig. 1, an eddy current 11 of hot gas is caused to turn back and pass across the chamber at a lower level directly above the billets as they pass through the chamber 2, thus serving to maintain evenly in the billets the heat which they acquire at the entrance end of the chamber.

The desired flame velocity may be obtained by supplying only a minor proportion of cool air from nozzles 9, whereby the temperature of the mixed preheated air and hot gas is not unduly reduced; for example, the temperature of the mixture may be readily kept up to about 1,000 degrees F. while still obtaining the desired flame velocity.

Furthermore, the temperature of parts of the burner construction such as the tubes 10, which latter usually will be of metal, is kept up well above the condensing point of the tarry content of the gas, being adequately heated by the gas and hot air, thereby preventing as minimizing the building-up of tarry deposits on the active parts of the burner, and the burner construction as a whole involves no restricted passage ways or the like which might clog up in such a way as to interfere with the use of hot uncleaned producer gas.

The passage ways 5 and 10 preferably are of Venturi shape to promote the aspirating action of the air streams issuing from nozzles 9, in drawing in and mixing the hot gas and preheated air from chambers 6 and 8.

While a specific form of the invention has been described, it will be obvious that any changes may be made therein without departing from its main features, within the scope of the appended claims.

I claim:

1. A combustion apparatus including a combustion chamber having a series of admission ports disposed along one side wall, a hot gas chamber running along said wall exterior thereto, and communicating with said ports, a preheated air chamber running along beside said gas chamber and adjacent thereto, compressed air nozzles projecting into said air chamber substantially in line with said ports, and tubes projecting into said gas chamber from said air chamber in line with said ports and nozzles, whereby hot air is drawn from the air chamber into the streams issuing from said nozzles and gas is drawn from the gas chamber into the streams issuing from said tubes and the mixture discharged through said ports into the combustion chamber.

2. A combustion apparatus including a combustion chamber, a low pressure hot gas chamber, and a low pressure hot air chamber, passageways leading from said hot air chamber to said gas chamber and from the latter through into said combustion chamber, and means for projecting relatively small streams of cool air under higher pressure through said passage ways to draw hot air and gas through said passageways into said streams and to project the mixture into said combustion chamber.

3. A combustion apparatus including a combustion chamber, a low pressure hot gas chamber, and a low pressure hot air chamber, passageways leading from said hot air chamber to said gas chamber and from the latter into said combustion chamber, and means for projecting relatively small streams of cool air under higher pressure through said passageways to draw hot gas and air through said passageways into said streams and to project the mixture into said combustion chamber with sufficient velocity to cause the resulting flame to carry clear across the combustion chamber, and to produce a return eddy passing back across the combustion chamber at a lower level.

In testimony that I claim the foregoing, I have hereunto set my hand this 24th day of September, 1928.

GEORGE R. McDERMOTT.